US009801324B2

(12) United States Patent
Lykken

(10) Patent No.: US 9,801,324 B2
(45) Date of Patent: Oct. 31, 2017

(54) BI-FOLD TOOL BAR LINKAGE

(71) Applicant: NORWOOD SALES Inc., Horace, ND (US)

(72) Inventor: Tom Lykken, Fargo, ND (US)

(73) Assignee: NORWOOD SALES Inc., Horace, ND (US)

( * ) Notice: Subject to any disclaimer, the term of this patent is extended or adjusted under 35 U.S.C. 154(b) by 0 days.

(21) Appl. No.: 14/619,305

(22) Filed: Feb. 11, 2015

(65) Prior Publication Data

US 2015/0223387 A1    Aug. 13, 2015

Related U.S. Application Data

(60) Provisional application No. 61/938,538, filed on Feb. 11, 2014.

(51) Int. Cl.
*A01B 73/06* (2006.01)

(52) U.S. Cl.
CPC .................. *A01B 73/065* (2013.01)

(58) Field of Classification Search
CPC .................................... A01B 73/065
USPC ......................................... 172/311
See application file for complete search history.

(56) References Cited

U.S. PATENT DOCUMENTS

| 2,226,586 | A | * | 12/1940 | Seaholm | ................ | A01B 21/08 172/240 |
| 3,620,550 | A | | 11/1971 | Hornung | | |
| 3,791,673 | A | * | 2/1974 | Hornung | ................ | A01B 73/02 172/311 |
| 3,810,660 | A | * | 5/1974 | Peterson | ............. | B62D 63/061 172/272 |
| 4,034,623 | A | * | 7/1977 | Boone | .................. | A01B 73/065 172/240 |
| 5,024,279 | A | * | 6/1991 | Warner | ................ | A01B 73/065 172/1 |
| 5,088,563 | A | * | 2/1992 | Shidler | ................ | A01B 73/065 172/311 |
| 5,488,996 | A | | 2/1996 | Barry et al. | | |
| 5,493,853 | A | * | 2/1996 | Tonutti | ................. | A01D 78/146 56/377 |
| 5,598,691 | A | * | 2/1997 | Peeters | ................ | A01D 78/001 56/377 |

(Continued)

FOREIGN PATENT DOCUMENTS

WO    WO-2015123286 A1    8/2015

OTHER PUBLICATIONS

"International Application Serial No. PCT/US2015/015401, International Search Report mailed May 13, 2015", 2 pgs.

(Continued)

*Primary Examiner* — Thomas B Will
*Assistant Examiner* — Joel F. Mitchell
(74) *Attorney, Agent, or Firm* — Schwegman Lundberg & Woessner, P.A.

(57) ABSTRACT

A farm implement having rotatable wings rotatably connected to a main carrier and also having a folding bar linkage, which folds as the corresponding wing is rotated into a stowed position and extends as the wing rotates into a deployed position. A fixed length control bar rotatably linking a tow bar of the folding bar linkage to the main carrier controls the folding and unfolding of the bar linkage as the wing rotates between the deployed and stowed positions.

17 Claims, 4 Drawing Sheets

(56) References Cited

U.S. PATENT DOCUMENTS

| | | | | |
|---|---|---|---|---|
| 5,752,375 | A * | 5/1998 | Tonutti | A01D 78/146 56/365 |
| 6,945,024 | B2 * | 9/2005 | Tonutti | A01D 78/146 56/377 |
| 7,849,933 | B2 * | 12/2010 | Marggi | A01B 73/067 172/311 |
| 7,854,273 | B2 * | 12/2010 | Friggstad | A01B 73/065 172/311 |
| 2006/0090910 | A1 | 5/2006 | Houck | |
| 2007/0163791 | A1 | 7/2007 | Meek | |
| 2010/0101811 | A1 | 4/2010 | Friggstad et al. | |

OTHER PUBLICATIONS

"International Application Serial No. PCT/US2015/015401, Written Opinion mailed May 13, 2015", 6 pgs.

"International Application Serial No. PCT/US2015/015401, International Preliminary Report on Patentability mailed Aug. 25, 2016", 8 pgs.

"Canadian Application Ser. No. 2,939,563, Office Action dated Jun. 27, 2017", 6 pgs.

* cited by examiner

Fixed Length Tow bar

Fixed Length Tow bar

Hitch and Wing distance
Fixed Length Tow bar

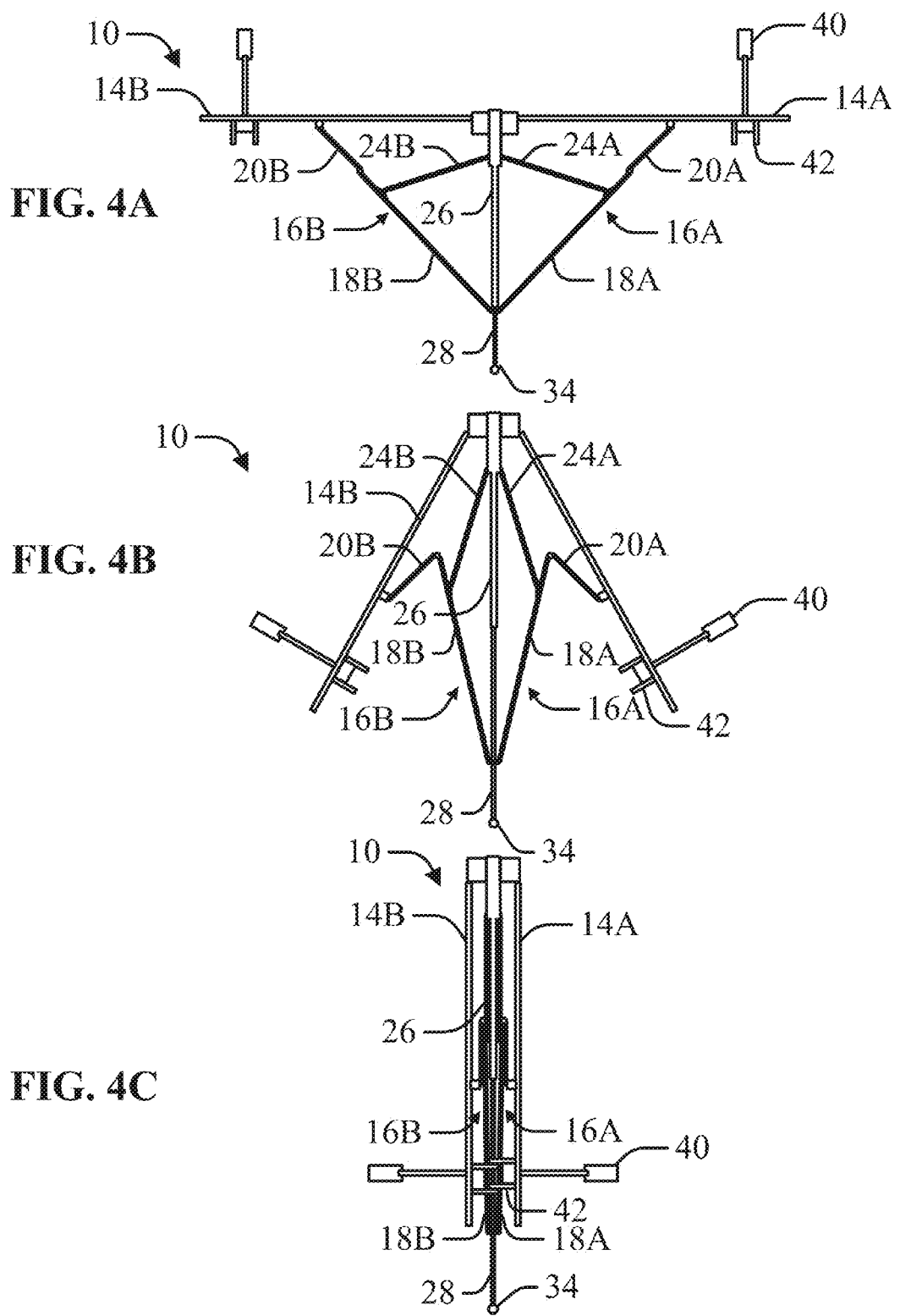

BI-FOLD TOOL BAR LINKAGE

CLAIM OF PRIORITY

This patent application claims the benefit of priority, under 35 U.S.C. Section 119(e), to Tom Lykken, U.S. Patent Application Ser. No. 61/938,538, entitled "BI-FOLD TOOL BAR LINKAGE," filed on Feb. 11, 2014, each of which is hereby incorporated by reference herein in its entirety.

TECHNICAL FIELD

This document pertains generally, but not by way of limitation, to farm implements having foldable wings.

BACKGROUND

Farm implements often have a main carrier that can be towed behind a tractor or other motorized farm machinery. Certain implements, such as planting implements, have wings on which a plurality of features can be positioned. The wings extend transversely from the main carrier to align each of the features with a row to be planted or otherwise processed when the farm implement is being towed along an axis parallel to the rows. Farm implements are can be sized such that as many as 48 rows can be simultaneously processed resulting in wings that are each about 60 ft. or greater in length. The wings are often attached to the main carrier in a hinged configuration such that the wings can be folded against the main carrier to transport the main carrier when not being operated. During operation, a tow bar attached to an attachment point on the main carrier and extends to an attachment point on the corresponding wing. The tow bar extends at an angle from the main carrier to the wings to support the extended wings while the main carrier is being towed behind the tractor or other machinery.

Certain farm implements have fixed length tow bars. In this configuration, the tow bar is slidably connected to the main carrier and rotatably connected to the corresponding wing. However, the sliding connection to the main carrier requires that the main carrier includes an elongated track, which increases the effective length of the main carrier. The greater overall length can increase the difficulty of navigating of the farm implement during use or transport of the farm implement. The greater overall length also limits the buildings capable of storing the farm implement when not in use. The additional length of the main carrier also substantially increases the weight of the overall farm implement requiring additional or larger tires or treads to distribute the effectively distribute the additional weight.

Alternatively, certain farm implements have telescoping tow bars that can be extended or retracted to change the effective length as the wings are extended from or folded against the main carrier. Although the telescoping tow bars allow for a shorter main carrier, the telescoping tow bars are often substantially heavier than fixed length tow bars. In addition, the mechanical or hydraulic equipment necessary to extend or retract the telescoping tow bars also add to the overall weight of the farm implement and must be distributed by additional or larger tires or treads.

The added size and weight created by the tow bars requires more powerful tractors or machinery to efficiently transport and navigate farm implements. In addition, larger or additional tires or treads are required to prevent the farm implement from sinking into soil.

Overview

The present inventors have recognized, among other things, that a problem to be solved can include supporting extended wings of a farm implement that can folded against the main carrier of the farm implement without excessively increasing the effective weight or length of the farm implement. In an example, the present subject matter can provide a solution to this problem, such as by linking each wing to the main carrier by a folding bar linkage, which folds as the corresponding wing is rotated into a stowed position. A fixed length control bar rotatably linking a tow bar of the folding bar linkage to the main carrier controls the folding and unfolding of the bar linkage as the wing rotates between the deployed and stowed positions. The folding bar linkage avoids the need for an elongated track to receive the excess length of a fixed bar linkage when the wing is rotated into the stowed position, thereby reducing the overall weight and length of the farm implement. The fixed length control bar provides a relatively lightweight control mechanism for controlling the folding and unfolding bar linkage. In addition, each control bar can be operably connected to an opposing control bar for the opposing wing to coordinate opening and closing of the wing. Similarly, the operably connected control bars allow sharing of the load required to open the opposing wings between the opposing wings. Specifically, the operably connected control bars cause the wings to open in a coordinated fashion even if the load required to open one of the wings is different from the load required to open the other wings due to terrain and other factors.

A farm implement, according to an example of the present subject matter can comprise a main carrier and a first wing rotatably connected to the main carrier. The main carrier can comprise a telescoping element movable between an extended position and a retracted position. The first wing can be rotated relative to the main carrier between a deployed position and a stowed position. The farm implement can also comprise a first bar linkage comprising a first tow bar rotatably connected to the telescoping element, a first gate rotatably connected to the first wing, and a first hinge rotatably connecting the first tow bar to the first gate. The farming implement can also comprise a first control bar rotatably connecting the main carrier to the first tow bar. Moving the telescoping element into the retracted position unfolds the first bar linkage to rotate the first wing into the deployed position and moving the telescoping element into the extended position folds the first bar linkage to rotate the first wing into the stowed position.

A system for extending at least one rotatable wing, according to an example of the present subject matter can comprise a main carrier comprising a telescoping element movable between an extended position and a retracted position. The wing can be rotatably connected to the main carrier. The system can also comprise a first bar linkage that can comprise a first tow bar rotatably connected to the telescoping element, a first gate rotatably connected to the first wing, and a first hinge rotatably connecting the first tow bar to the first gate. The system can also comprise a first control bar rotatably connecting the main carrier to the first tow bar such that moving the telescoping element into the retracted position unfolds the first bar linkage to rotate the first wing into a deployed position and moving the telescoping element into the extended position folds the first bar linkage to rotate the first wing into a stowed position.

This overview is intended to provide an overview of subject matter of the present patent application. It is not intended to provide an exclusive or exhaustive explanation of the present subject matter. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4A is a schematic view of a farm implement having a folding linkage bar and a wing positioned in a deployed position according to an example of the present subject matter.

FIG. 4B is a schematic view of the farm implement depicted in FIG. 4A with the wing partially retracted according to an example of the present subject matter.

FIG. 4C is a schematic view of the farm implement depicted in FIG. 4A with the wing rotated into the stowed position according to an example of the present subject matter.

DETAILED DESCRIPTION

Figure 1A:
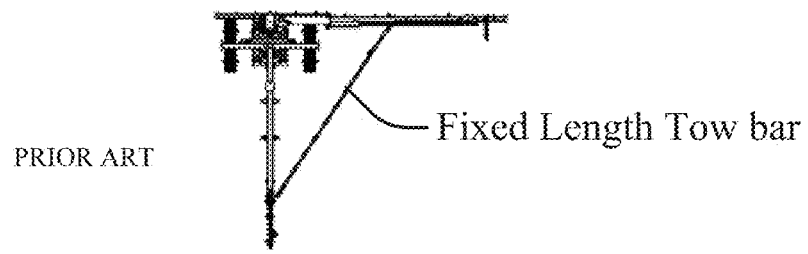
FIG. 1A is a partial top view of a farm implement having a fixed length tow bar and a wing positioned in a deployed position.
Figure 1B:
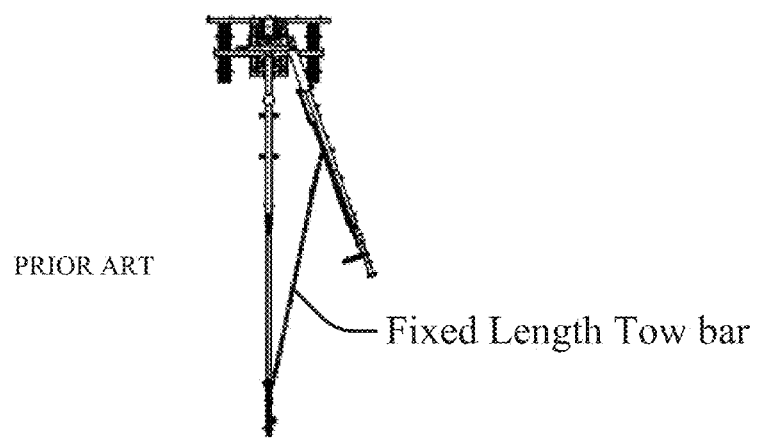
FIG. 1B is a partial top view of the farm implement depicted in FIG. 1A with the wing partially retracted.
Figure 1C:
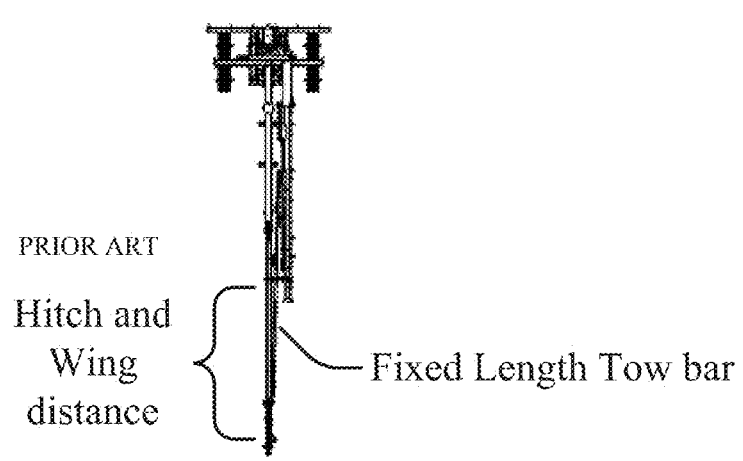
FIG. 1C is a partial top view of the farm implement depicted in FIG. 1A with the wing rotated into the stowed position.
Figure 2:
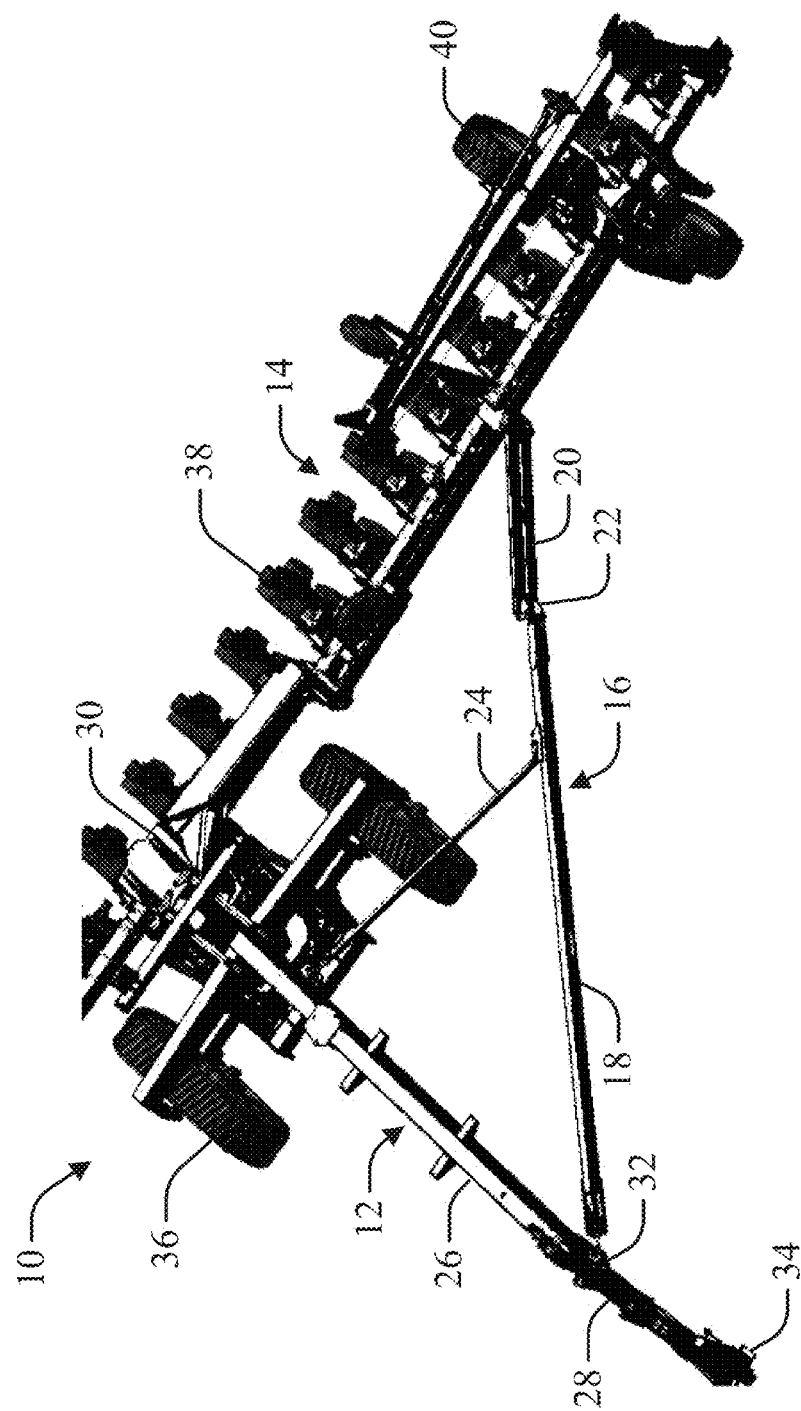
FIG. 2 is a perspective view of a farm implement having a folding linkage bar according to an example of the present subject matter.

As depicted in FIG. 2, a farm implement 10, according to an example of the present disclosure, can comprise a main carrier 12, at least one wing 14 and a bar linkage 16 corresponding to each wing 14. The wing 14 can be rotatably connected to the main carrier 12 such that the wing 14 can be rotated between a deployed position, shown in FIG. 2, and a stowed position. Each bar linkage 16 operably connects the main carrier 12 to the wing 14 to control rotation of the wing 14 and prevent over rotation of the wing 14 past the deployed position when the main carrier 12 is towed. Each bar linkage 16 can comprise a tow bar 18 rotatably connected to a gate 20 by a hinge 22. Unlike the fixed length tow bar configuration illustrated in FIGS. 1A-1C, the hinge 22 allows the bar linkage 16 to fold as the wing 14 is rotated into the stowed position and unfold when wing 14 is rotated into the deployed position. A control bar 24 extends from the main carrier 12 to the tow bar 18 to control folding and unfolding of the bar linkage 16. The folding bar linkage 16 allows for the main carrier 12, and correspondingly the farm implement 10, to have a shorter effective length when the wing 14 is rotated into the deployed position improving control of the farm implement 10 during operation. Similarly, the folding bar linkage 16 allows the bar linkage 16 to be attached to the wing 14 further from the connection point of the wing 14 to the main carrier 12 thereby improving the leverage of the bar linkage 16 on the wing 14. The improved leverage on the wing 14 permits a smaller and/or lighter weight bar linkage 16 assembly thereby reducing the overall weight of the farm implement 10.

As depicted in FIGS. 2 and 3A-3C, the main carrier 12 can comprise a main body 26 and a telescoping portion 28. The main body 26 can include a hinge assembly 30 for rotatably connecting each wing 14 to the main body 26 such that the wing 14 can rotate relative to the main carrier 12. The telescoping portion 28 can be slidably connected to the main body 26 such that the telescoping portion 28 is slidable between a retracted position and an extended position, shown in FIGS. 3A and 3C respectively. In at least one example, the main body 26 comprises a sleeve for slidably receiving the telescoping portion 28. The main body 26 can include an extending apparatus for moving the telescoping portion 28, which can include, but is not limited to a hydraulic piston, a pulley system, a toothed track and other motorized elements for extending or retracting the telescoping portion 28. In at least one example, the main carrier 12 defines a central axis A-A. The telescoping portion 28 can move parallel to the central axis A-A between the extended and retracted positions. The telescoping portion 28 can also comprise a tow bar attachment 32 that moves axially along the central axis A-A relative to the main body 26 with the telescoping portion 28 as the telescoping portion 28 is slid between the retracted position and the extended position.

In an example, the telescoping portion 28 can also comprise a hitch assembly 34 for operably connecting the main carrier 12 to a tractor or other motorized machinery for towing of the main carrier 12. The main body 26 can also comprise at least one primary wheeled support 36 for supporting the main carrier 12. In certain examples, the primary wheeled support 36 can comprise a wheel or a tread (as shown in FIG. 2.). In at least one example, at least one of the primary wheeled supports 36 is positioned on the main carrier 12 opposite the hitch assembly 34. In this configuration, the primary wheeled support 36 and the hitched tractor cooperate to support the farm implement 10. The distance D1 between the hitch assembly 34 and the primary wheeled support 12 along central axis A-A can control the turn radius of the farm implement 10 as the farm implement 10 is towed. A shorter distance D1 can reduce the turn radius of the farm implement 10 thereby improving overall control of the farm implement 10 while navigating the farm implement 10.

Figure 3A:
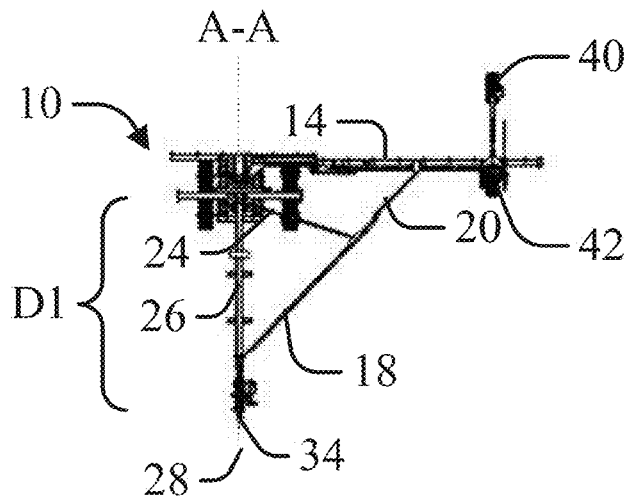
FIG. 3A is a partial top view of a farm implement having a folding linkage bar and a wing positioned in a deployed position according to an example of the present subject matter.
Figure 3B:
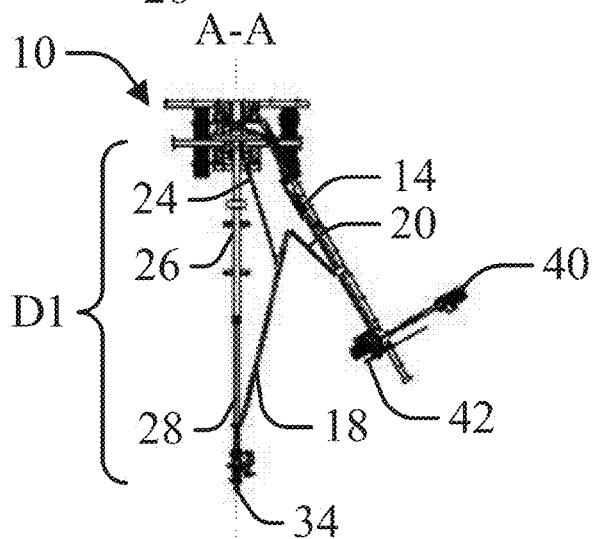
FIG. 3B is a partial top view of the farm implement depicted in FIG. 3A with the wing partially retracted according to an example of the present subject matter.
Figure 3C:
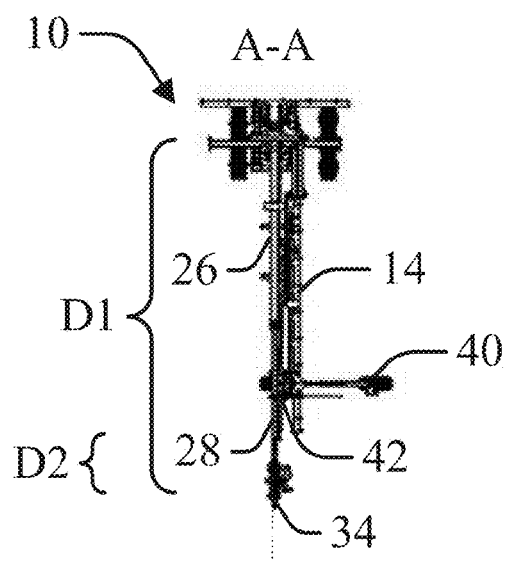
FIG. 3C is a partial top view of the farm implement depicted in FIG. 3A with the wing rotated into the stowed position according to an example of the present subject matter.

As depicted in FIGS. 2 and 3A-3C, each wing 14 can be rotatably connected to the hinge assembly 30. Each wing 14 can be rotated between a deployed position in which the wing 14 transversely from the central axis A-A of the main carrier 12 (as shown in FIG. 3A) and a stowed position in which the wing 14 is positioned parallel to the central axis A-A of the main carrier 12 (as shown in FIG. 3C). In at least one example, the end of each wing 14 is proximate to the hitch assembly 34 when the wing 14 is rotated into the stowed position. The distance D2 between the end of the wing 14 and the hitch assembly 34 can control the overall effective length of the farm implement 10 when the wings 14 are positioned in the stored position. A shorter distance D2 reduces the overall effective length of the farm implement 10 thereby simplifying maneuvering of the farm implement 10 when the wings 14 are positioned in the stored position. The distance D2 can have a predetermined minimum distance such that the tractor or other towing machinery can turn relative to the farm implement 10 without contacting the ends of the wings 14.

In at least one example, a plurality of features 38 can be positioned on each wing 14. The features 38 can be spaced apart on the wings 14 such that each feature 14 aligns with a row to be planted or processed when the wing 14 is positioned in the deployed position. As depicted in FIG. 2, the features 38 comprise planters for depositing seeds in rows, but can comprise blades, sprayers or other features for processing the rows.

In at least one example, each wing 14 can include at least one secondary wheeled support 40 for supporting the wing 14 and reducing the weight of the wing 14 that is supported by the bar linkage 16. The secondary wheeled support 40 can be oriented to support the wing 14 when the wing 14 is positioned in the deployed position and as the wing 14 is rotated between the deployed position and the stowed position. In certain examples, the secondary wheeled support 40 can comprise a wheel (as shown in FIG. 2) or a tread for supporting the wing 14 in the deployed position as the farm implement 10 is being towed by a tractor or other motorized machinery. In at least one example, each wing 14 can include a hook element 42 that can be moved to selectively engage to the main carrier 12. The hook element 42 can engage the main carrier 12 when the wings 14 are positioned in the stowed position to elevate the corresponding wing 14 relative to the main carrier 12. The wing 14 can be elevated such that the secondary wheeled support 40 are lifted off the ground and the entire farm implement 10 is supported by the primary wheeled supports 36. This arrangement reduces rolling resistance from the secondary wheeled support 40 allowing for efficient transport of the farming implement 10. Similarly, the secondary wheeled support 40 can be fixed to rotate along a single axis simplifying the secondary wheeled support 40 and reducing the weight of the wing 14.

As depicted in FIGS. 2 and 3A-3C, each bar linkage 16 can comprise a tow bar 18 rotatably connected to a gate 20 by a hinge 22. In an example, the gate 20 can define less than ½ the effective length of the bar linkage 16. In yet another example, the gate 20 can define less than ⅓ the effective length of the bar linkage 16. In yet another example, the gate 20 can define less than ¼ the effective length of the bar linkage 16. The tow bar 18 can be rotatably connected to the tow bar attachment 32 on the telescoping portion 28 of the main carrier 12. The gate 20 can be rotatably connected to the wing 14 such that the bar linkage 16 operably connects the wing 14 to the telescoping portion 28. Each wing 14 can have a length defined as extending from the end of the wing 14 connected to the hinge assembly 30 to the free end of the wing 14. In an example, the gate 20 can be rotatably connected to the wing 14 at an attachment point more than about ⅓ of the length of the wing 14 from the hinge assembly 30. In yet another example, the gate 20 can be rotatably connected to the wing 14 at an attachment point more than about ½ of the length of the wing 14 from the hinge assembly 30. In yet another example, the gate 20 can be rotatably connected to the wing 14 at an attachment point more than about ⅔ of the length of the wing 14 from the hinge assembly 30. A control bar 24 rotatably connects the main body 26 of the main carrier 12 to the tow bar 18.

In operation, the bar linkage 16 operably connects the telescoping portion 28 to the wing 14 such that moves the telescoping portion 28, and corresponding the tow bar attachment 32, toward the extended position moves the effective attachment point of the tow bar 18 axially as illustrated in FIG. 3B. The control bar 24 has a fixed length, which rotates the tow bar 18 toward to the main carrier 12 as the telescoping portion 28 moves toward the extended position. The rotation of the tow bar 18 folds the bar linkage 16 and pulls the corresponding wing 14 toward the stowed position via the gate 20. In an example, after the wing 14 is rotated into the stowed position, the hook element 42 can be rotated to engage the main carrier 12 and elevate the wing 14 relative to the main carrier 12 for transportation or navigation of the farm implement 10. Similarly, moving the telescoping portion 28 toward the retracted position causes the control bar 24 rotates the tow bar 18 away from the main carrier 12. The rotation of the tow bar 18 away from the main carrier 12 extends the bar linkage 16 and rotates the wing 14 into the deployed position.

As depicted in FIGS. 4A-4C, the farm implement 10 can comprise a first wing 14A and a second wing 14B. The farm implement 10 can also comprises a first bar linkage 16A corresponding to the first bar wing 14A and a second bar linkage 16B corresponding to the second bar wing 14B. In this configuration, the first tow bar 18A of the first bar linkage 16A and the second tow bar 18B of the second bar linkage 16B are operably connected to the tow bar attachment 32 of the main carrier 12. In operation, the first bar linkage 16A and the second bar linkage 16B coordinate movement of the first wing 14A and the second wing 14B such that movement of the telescoping portion 28 between the extended portion and the retracted position moves both the first wing 14A and the second wing 14B together. The first bar linkage 16A and the second bar linkage 16B allow the first wing 14A and the second wing 14B to move together even when the load requirement for rotating the first wing 14A and the second wing 14B is uneven. The uneven load can be caused by different terrain beneath the secondary wheeled support 40, rotating the wings 14A, 14B when the farm implement 10 is on uneven ground or other reasons.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the present subject matter can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stowed on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present subject matter should be determined with reference to the appended claims, along with the full scope of equivalents to which such claims are entitled.

What is claimed is:

1. A farm implement, comprising:
    a main carrier comprising a telescoping element movable between an extended position and a retracted position;
    a first wing rotatably connected to the main carrier such that the first wing is rotatable relative to the main carrier between a deployed position and a stowed position;
    a first bar linkage comprising:
        a first tow bar rotatably connected to the telescoping element,
        a first gate rotatably connected to the first wing, and
        a first hinge rotatably connecting the first tow bar to the first gate; and
    a first control bar rotatably connected to the main carrier at a first end and rotatably connected to the first tow bar at a second end such that moving the telescoping element into the retracted position unfolds the first bar linkage to rotate the first wing into the deployed position and moving the telescoping element into the extended position folds the first bar linkage to rotate the first wing into the stowed position.

2. The farm implement of claim 1, wherein the main carrier further includes at least one primary wheeled support for supporting the farm implement, wherein the at least one primary wheeled support comprises at least one of a wheel and a tread.

3. The farm implement of claim 2, wherein the first wing is elevated in the stowed position such that the primary wheeled support supports the first wing.

4. The farm implement of claim 3, wherein the first wing includes a secondary wheeled support positioned to support the first wing when the first wing is rotated into the deployed position;
    wherein the at least one secondary wheeled support comprises at least one of a wheel and a tread.

5. The farm implement of claim 4, wherein the first wing includes a hook element engagable to the main carrier and rotatable to elevate the first wing such that the farm implement is supported solely by the primary wheeled element.

6. The farm implement of claim 1, wherein the main carrier further comprises a hinge assembly;
    wherein the first wing is rotatably connected to the hinge assembly at a first end and defines a length extending from the first end to an opposite second end.

7. The farm implement of claim 6, wherein the first gate is mounted to the first wing at least about ⅓ of the length of the first wing from the first end.

8. The farm implement of claim 6, wherein the first gate is mounted to the first wing at least about ½ of the length of the first wing from the first end.

9. The farm implement of claim 1, wherein the first gate has a length less than ⅓ of an effective length of the first bar linkage.

10. The farm implement of claim 1, further comprising:
    a second wing rotatably connected to the main carrier such that the second wing is rotatable relative to the main carrier between a deployed position and a stowed position;
    a second bar linkage comprising:
        a second tow bar rotatably connected to the telescoping element,
        a second gate rotatably connected to the second wing, and
        a second hinge rotatably connecting the second tow bar to the second gate; and
    a second control bar rotatably connecting the main carrier to-the second tow bar such that moving the telescoping element into the retracted position unfolds the second bar linkage to rotate the second wing into the deployed position and moving the telescoping element into the extended position folds the second bar linkage to rotate the second wing into the stowed position; wherein the first control bar and the second control bar are operably connected at the telescoping element to coordinate rotation of the first wing and the second wing between the deployed position and stowed position.

11. A system for extending a first wing, comprising:
    a main carrier comprising a telescoping element movable between an extended position and a retracted position, wherein the first wing is rotatably connected to the main carrier;
    a first bar linkage comprising:
        a first tow bar rotatably connected to the telescoping element, a first gate rotatably connected to the first wing, and a first hinge rotatably connecting the first tow bar to the first gate; and a first control bar rotatably connected to the main carrier at a first end and rotatably connected to the first tow bar at a second end such that moving the telescoping element into the retracted position unfolds the first bar linkage to rotate the first wing into a deployed position and moving the telescoping element into the extended position folds the first bar linkage to rotate the first wing into a stowed position.

12. The system of claim 11, wherein the main carrier further includes at least one primary wheeled support for supporting the farm implement, wherein the at least one primary wheeled support comprises at least one of a wheel and a tread.

13. The system of claim 11, wherein the main carrier further comprises a hinge assembly;

wherein the first wing is rotatably connected to the hinge assembly at a first end and defines a length extending from the first end to an opposite second end.

14. The system of claim 13, wherein the first gate is mounted to the first wing at least about ⅓ of the length of the first wing from the first end.

15. The system of claim 13, wherein the first gate is mounted to the first wing at least about ½ of the length of the first wing from the first end.

16. The system of claim 11, wherein the first gate has a length less than ⅓ of an effective length of the first bar linkage.

17. The system of claim 11, further comprising:

a second bar linkage comprising:

a second tow bar rotatably connected to the telescoping element, a second gate rotatably connectable to a second wing, and a second hinge rotatably connecting the second tow bar to the second gate; and a second control bar rotatably connecting the main carrier to-the first tow bar such that moving the telescoping element into the retracted position unfolds the second bar linkage to rotate the second wing into the deployed position and moving the telescoping element into the extended position folds the second bar linkage to rotate the second wing into a stowed position; wherein the first control bar and the second control bar are operably connected at the telescoping element to coordinate rotation of the first wing and the second wing between the deployed position and stowed position.

* * * * *